UNITED STATES PATENT OFFICE.

EUGEN FRANK, OF ELBERFELD, PRUSSIA, GERMANY, ASSIGNOR TO FARBEN-FABRIKEN, VORMALS FRIEDR. BAYER & CO., OF SAME PLACE.

YELLOW COLORING-MATTER.

SPECIFICATION forming part of Letters Patent No. 329,638, dated November 3, 1885.

Application filed July 15, 1884. Serial No. 137,788. (Specimens.)

*To all whom it may concern:*

Be it known that I, EUGEN FRANK, residing at Elberfeld, in the Kingdom of Prussia and Empire of Germany, have invented a new and useful Improvement in the Manufacture of Dye-Stuffs or Coloring-Matters, of which the following is a specification.

My invention relates to the production of a new yellow dye-stuff by the action of tetrazo-diphenyl upon oxybenzoic acid, especially salicylic acid.

In carrying out my invention practically, I proceed as follows: Ten (10) kilos of benzidin sulphate are suspended in a finely-comminuted condition in one hundred and fifty liters cold water. To this twenty (20) kilos of muriatic acid of 21° Baumé are added, and the nitration is accomplished by means of five (5) kilos of sodium nitrite dissolved in water, which are slowly added. The benzidin sulphate not soluble in water dissolves gradually, and a honey-yellow solution of tetrazo-diphenyl chloride appears. If the thus-obtained tetrazo combination slowly flows into a solution of five to ten kilos of pure salicylic acid, or either of the two other isomeric oxybenzoic acids in forty kilos sodium hydrate and two hundred and fifty liters water, while stirring violently, the following combination is formed, viz:

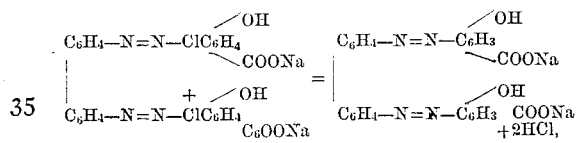

a brown-yellow amorphous precipitate of an oxyazo combination, which forms the above-mentioned yellow dye-stuff. After having been allowed to rest for several hours, the formed precipitate is filtered, and I then wash with cold water until this filtered precipitate is neutral—until the filtrate does not turn red litmus-paper blue. The paste remaining in the press may be immediately used for dyeing and printing. In the dry state it represents a brown-red powder, which is difficult to dissolve in hot water, but insoluble in cold water, and when the hot aqueous solution gets cold small yellow needle-shaped crystals are formed of a silk-like luster. The aqueous solution of these crystals will turn violet red by acids, and brown by alkali.

Owing to the great difficulty of dissolving the dry combination, it is best used as a paste for dyeing.

Unmordanted cotton is dyed a fine sulphur-yellow color in a boiling soap bath, and is conspicuous for producing shades fast to scouring and sunlight.

I do not in this application claim the process described, intending to make a separate application therefor.

What I claim as my invention, and desire to secure by Letters Patent, is—

The coloring-matter herein described and having the properties specified.

EUGEN FRANK.

Witnesses:
GEO. H. EVANS,
WM. A. POLLOCK.